H. J. LELAND.
POWER HACKSAW.
APPLICATION FILED JUNE 20, 1910.
989,164.
Patented Apr. 11, 1911.
4 SHEETS—SHEET 4.
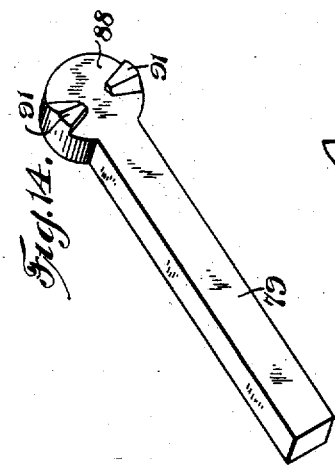
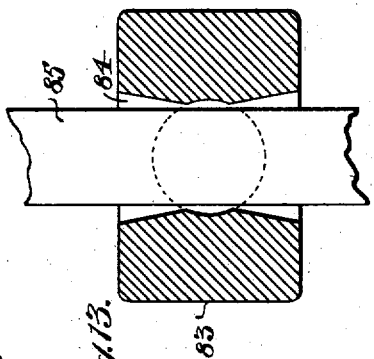
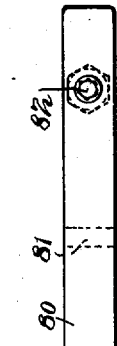
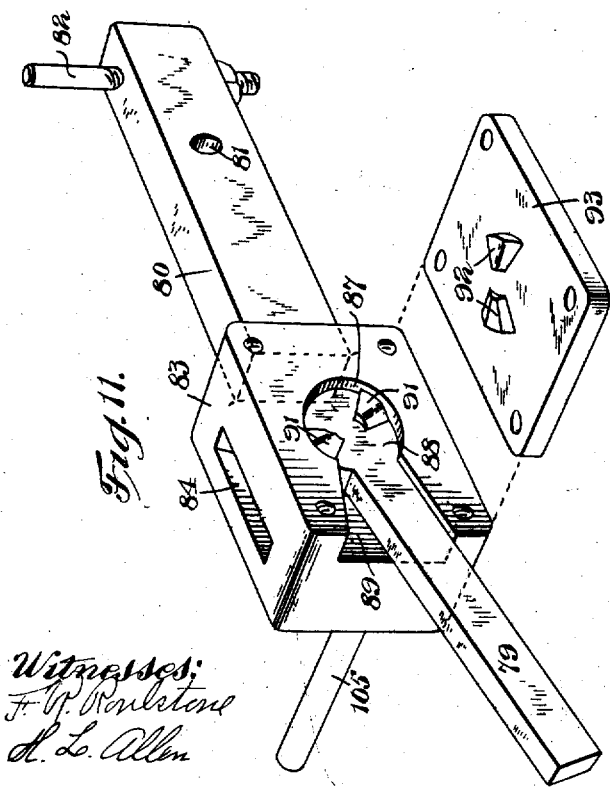
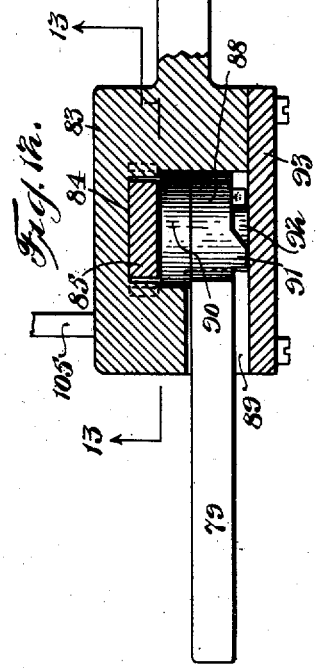
Witnesses:
F. P. Roulstone
H. L. Allen
Inventor:
Herbert J. Leland,
By Wright Brown Quinby May
Attys

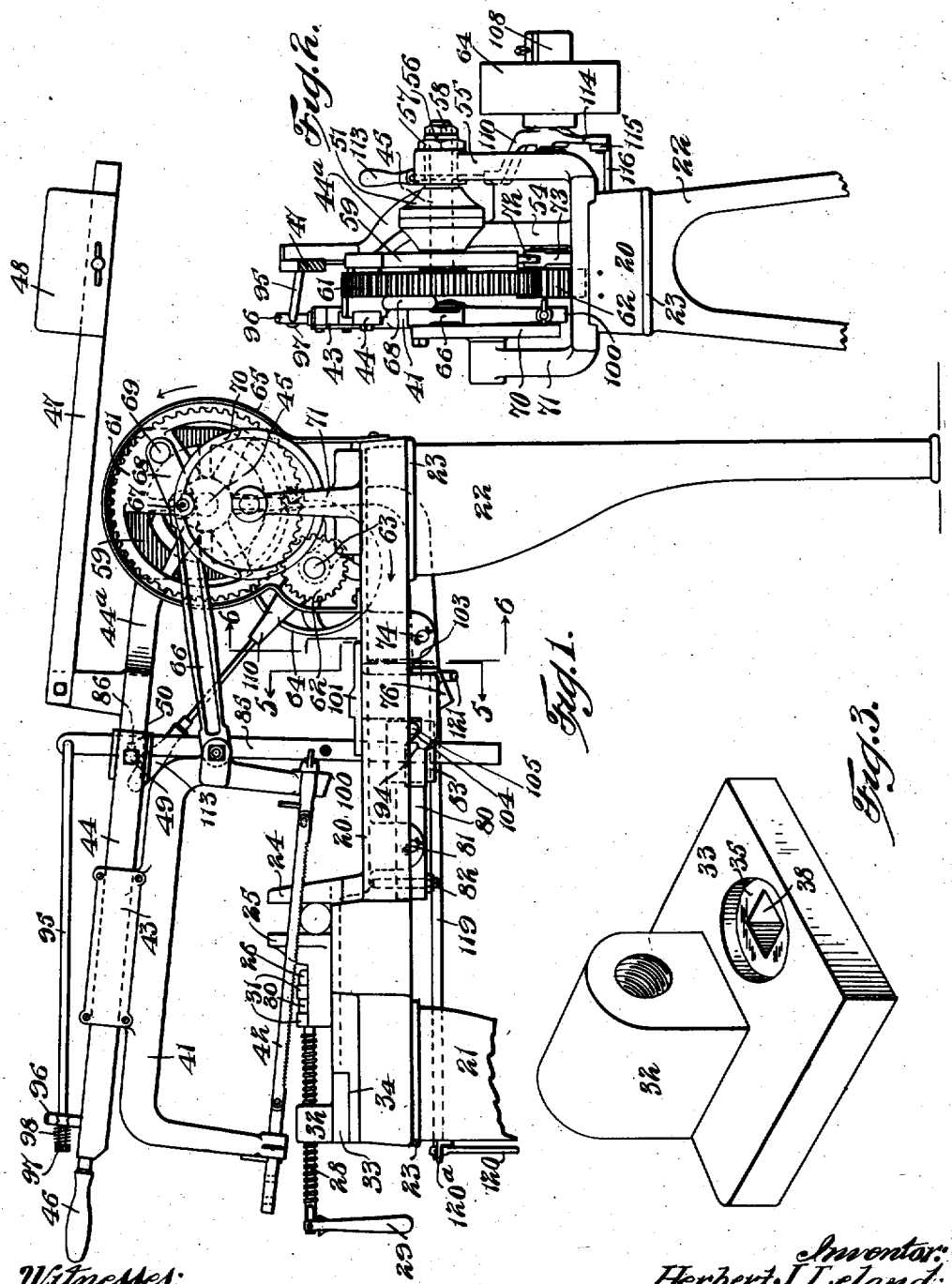

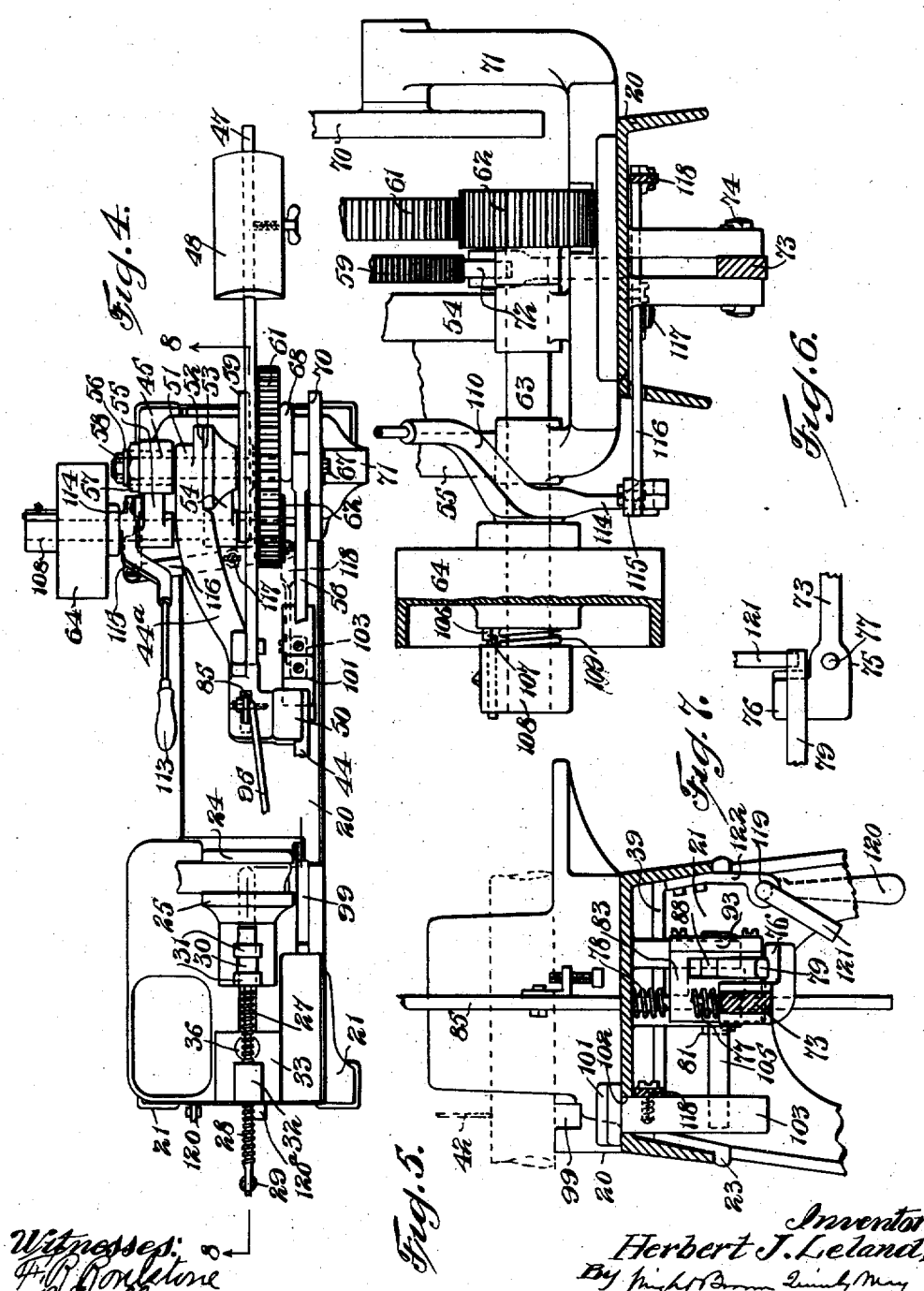

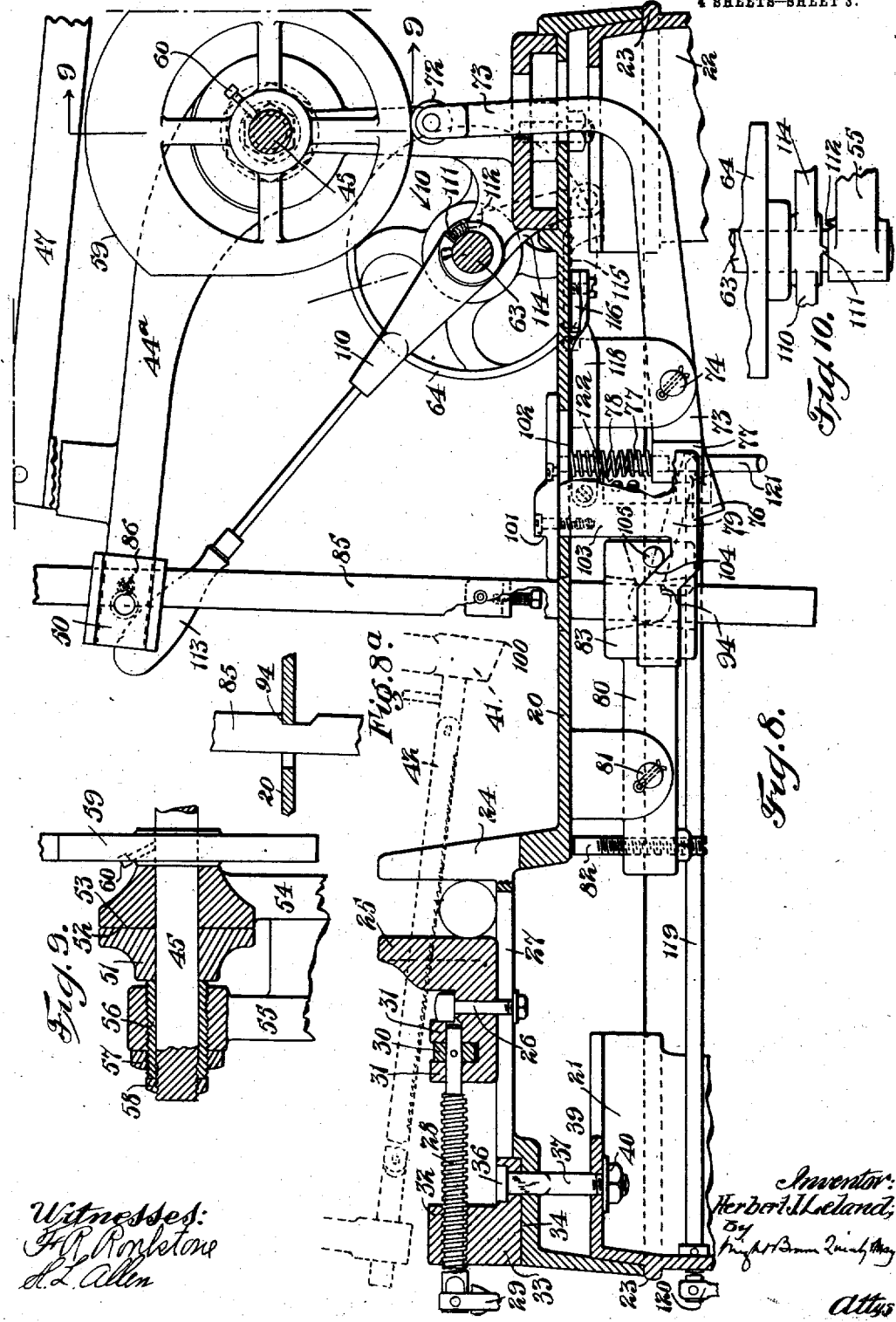

UNITED STATES PATENT OFFICE.

HERBERT J. LELAND, OF MONTAGUE, MASSACHUSETTS, ASSIGNOR TO MILLERS FALLS COMPANY, OF MILLERS FALLS, MASSACHUSETTS, A CORPORATION OF MASSACHUSETTS.

POWER-HACKSAW.

989,164.

Specification of Letters Patent.

Patented Apr. 11, 1911.

Application filed June 20, 1910. Serial No. 567,783.

*To all whom it may concern:*

Be it known that I, HERBERT J. LELAND, of Montague, in the county of Franklin and State of Massachusetts, have invented certain new and useful Improvements in Power-Hacksaws, of which the following is a specification.

This invention relates to hack saws actuated by power for cutting metal rods or bars, and refers particularly to that type of such machines in which the saw is lifted automatically slightly from the work on each return movement, the return movement being much more rapid than the advance or cutting stroke of the saw.

One of the objects of the invention is to provide means whereby the saw will be held slightly above the work, regardless of the diameter of the latter, when said work is being manipulated along the clamping jaws for measuring the length to be cut off.

Another object of the invention is to provide a structure in which a single strut or bar is utilized to effect the automatic lifting of the saw during its quick return movement, and to hold the saw frame elevated during the placing of the work.

Another object is to provide improved means for obtaining the relatively slow and fast reciprocating movements of the saw frame during the cutting and return strokes.

Another object is to provide improved clamping devices for automatically gripping the lifter bar or strut.

Another object is to provide improved mechanism for insuring the steady holding of the saw frame guide to prevent lateral movement of the latter.

Other objects of the invention are to provide improved bed frame and work-clamping devices, all as will be more fully hereinafter explained.

To these ends the invention consists in the construction and combination of parts substantially as hereinafter described and claimed.

Of the accompanying drawings,—Figure 1 is a side elevation of a machine embodying the present improvements. Fig. 2 is a rear elevation of the same, the gear case being removed. Fig. 3 is a perspective view of the removable nut for the screw of the work-clamping mechanism. Fig. 4 is a plan view of the machine shown in Fig. 1, the saw frame and a portion of the guide therefor being omitted. Figs. 5 and 6 represent sections on lines 5—5 and 6—6 respectively of Fig. 1, but on a larger scale. Fig. 7 is a detail plan view of parts of the lifter-actuating devices. Fig. 8 represents a section on line 8—8 of Fig. 4. Fig. 8$^a$ is a detail side elevation of the portion of the lifting bar in which a recess is made to provide a shoulder, said figure also representing, in section, that portion of the table having the slot through which the lifting bar passes. Fig. 9 represents a section on line 9—9 of Fig. 8. Fig. 10 is a detail oblique elevation from the point indicated by the arrow 10 in Fig. 8. Fig. 11 is a perspective view of portions of the lifter clamp mechanism. Fig. 12 is a plan view of the same, partly in section. Fig. 13 represents a section on line 13—13 of Fig. 12. Fig. 14 is a detail perspective of one member of the compound clamping and lifting lever.

Similar reference characters indicate the same or similar parts in all of the views.

The table or bed frame 20 is mounted on two end leg frames 21 and 22, the latter having ribs 23 on which the lower edge of a depending flange or skirt of the bed frame rests, the portions of the leg frames above the ribs 23 fitting closely within said flange or skirt, whereby a light but rigid support for the parts of the mechanism is provided.

The work is clamped in a vise, comprising a fixed jaw 24 and a movable jaw 25, the latter having a bolt 26 depending from it through a slot 27 in the bed (see Fig. 8), and adjustable toward and from the fixed jaw by a screw 28 having a handle 29, the inner end of the screw having a collar 30 pinned to it, said collar being held between two lugs 31 rising from the heel of the jaw 25 (see Figs. 4 and 8). This provides a strong and durable connection between the movable jaw and operating screw, and facilitates repairs if either a broken jaw or screw requires the substitution of a new one. To further facilitate repairs, the nut 32 for the screw 28 is a separate piece from the bed frame. As illustrated in Figs. 1, 3 and 8, it has a base 33 fitting a recess 34 in the frame 20, and is itself formed with a recess 35 for the head 36 of a securing bolt 37 and an angular hole 38 for a similarly formed portion of said bolt, the latter passing down through the nut-supporting portion of the bed frame and through a hole in a web 39 at the top of the leg frame 21, and secured by a nut 40. This bolt therefore not only rigidly unites the leg frame 21 to the bed frame 20 but also rigidly holds the nut block in place.

In power hack saws, it sometimes happens that the adjustable jaw, or the screw, or the fixed nut for the latter, will break. By the structure just described, either of said members can be easily replaced by a new one.

The saw frame 41, carrying the hack saw blade 42, has a traveler 43 which is guided by the bar 44 pivotally mounted on shaft 45 (Figs. 4, 8 and 9), said bar having a handle 46 and a rearwardly extending arm 47 for the usual counterbalancing weight 48. Said guide bar is formed of two members coupled together at 50 by a bolt 49 (see Fig. 1). The forward member of the bar on which the traveler runs is straight, to provide for the correct guiding of the saw frame, and the rear member 44$^a$ is off-set as best shown in Fig. 4, and has an enlarged hub 51 (see also Fig. 9) with a flat side face 52 which bars against a wide flat side face 53 of one of the bearings in which the shaft 45 is mounted. As presently described, the guide bar is constantly oscillating slightly during operation, to provide for the lift of the saw from the work on the return stroke, and the two wide flat faces 52 and 53 serve to prevent lateral swinging of the guide bar and enables it to always accurately guide the saw frame. The two brackets which provide the bearings for the shaft are shown at 54 and 55. To take up wear of the hub 51 and to insure proper bearing always of the faces 52, 53 together, an adjustable sleeve 56 (see Fig. 9) surrounds the shaft 45 and is threaded in the bracket 55. The inner end of the sleeve is adjusted to bear against the hub 51 and is held when so adjusted by a nut 57. The shaft is held against longitudinal movement by a nut 58 at one end and the hub of the cam 59 which is secured to the shaft by suitable means such as a screw 60.

Secured to shaft 45 next to the cam is a gear 61, said gear meshing with, and driven by, a pinion 62 on a counter-shaft 63 on which is mounted a belt pulley 64. Preferably the gear and pinion are protected by a shield 65 (see Fig. 1).

The mechanism for imparting a slow cutting stroke to the saw frame, and a quick return movement, comprises a pitman 66 pivotally connected at one end to the saw frame and at the other end 67 to a link 68, which, in turn, is pivotally connected at 69 to the gear 61. The pivot pin 67 also extends into a crank, shown as a disk 70, which is mounted to revolve freely on or in a bearing provided by a bracket 71 (see Figs. 1, 2, 4 and 6). The axis of said bearing is below that of shaft 45. As the gear 61 is rotated in the direction of the arrow in Fig. 1, it drives the pitman 66 and the saw frame, through the medium of the link 68. But since the crank pin 67 is also that which connects the pitman and link, and since said crank pin revolves in a path which carries it to and from the center of motion of the driving gear, the saw frame necessarily travels faster when the crank pin is at the greatest distance from the center of the gear than when it is nearer said center. The connections are such that the slow movement is imparted during the cutting stroke and the faster movement during the return of the saw and when the latter is slightly lifted from the work as presently described.

The pitman 66 and link 68 practically constitute a jointed link, one member of which connects two cranks 67, 69, the axes of rotation of which are out of alinement, the other member connecting the crank 67 with the saw frame. But the crank 67 has a variable speed of rotation owing to the non-alinement of the axes of the two cranks, the crank 69 being the driving one.

The cam 59 acts upon a roll 72 carried by a lever 73 which is pivoted at 74 (see Figs. 1 and 8), the short arm of said lever having an enlargement 75 and a lateral projection or toe 76 (see Fig. 7). Rising from the enlargement 75 is a pin 77 on which is mounted a spring 78, the upper end of which bears under the bed frame and holds the lever in position with its roll in contact with the cam. The toe 76 extends under the end of an arm 79 of a lever 80 pivoted at 81 (see Figs. 7, 8, 11, 12 and 14), and having an adjustable stop screw 82 adapted to contact with the under surface of the bed frame to limit the movement of said lever in one direction. The longer and heavier end of the lever 80 is formed as a block 83 having a vertical opening 84 to receive the bar 85 which is pivoted to the saw-frame guide 44 at 86 (see Fig. 1). Communicating with the vertical opening 84 is a transverse circular opening 87 in which is fitted the circular head 88 of the arm 79, said arm passing out through a flaring passage 89 in the block. The members 79, 80, may be considered as constituting a jointed lever, the joint being due to the capability of the head 88 oscillating in the circular opening 87; but for convenience of description, the member 80 is herein usually referred to as the lever and the member 79 as an arm of that lever. A circular disk 90 (see Fig. 12) may be interposed between the head 88 and the bar 85, or said disk and head might be integral. The outer face of the head 88 is formed with one or more cam lugs 91 to coact with similar lugs 92 carried by a cover plate 93 secured to the side of the block 83. The operation of this portion of the mechanism is as follows: The cam 59 acts to depress the outer end of the lever 73 at the beginning of, and during the period of, the return movement of the saw. The toe 76, engaging the under side of the arm 79 of the compound or jointed lever 80 and by swinging said arm 79 so that its head 88 oscillates in the recess in the block 83, causes the cam lugs 91 to coact with the cam lugs 92 so that, since the latter are fixed, the said head 88 is shifted laterally to cause a binding of the lifter bar 85. Further movement of the arm 79 in the same direction lifts the block, the lever 80 swinging on its pivot 81. This lifting of the block 83 causes the bar 85 to elevate the guide bar 44 and the saw frame just enough to release the saw from the work or the bottom of the groove which has been partially cut therein. This of course occurs during every return movement of the saw.

In order that the same lifting bar 85 may serve as a strut to support the saw frame considerably elevated when work is being manipulated in its holder, the said bar 85 is formed with a shoulder 94 (see Figs. 1 and 8), so that, when the guide 44 and the saw frame are raised by the operator by means of the handle 46, the said shoulder 94 will engage a detent which is afforded by one edge of the slot in the bed frame 20 through which said bar 85 passes, said slot being indicated by dotted lines in Fig. 8, and shown also in Fig. 8ª.

As has been mentioned, the bar 85 is pivoted to the guide 44 at 86. To the upper end of the bar 85 is pivoted a release rod 95, said rod passing through an opening in a stud 96 rising from the guide 44, said rod 95 having a thumb piece 97 at its end near the handle 46, a spring 98 being interposed between said thumb piece and stud. The spring 98 exerts a pressure to cause the edge of the bar 85 which has the shoulder to ride along the end of the slot in the frame 20 through which the bar 85 passes, so that the shoulder 94 will automatically engage the end of said slot when the operator elevates the saw frame guide. When it is desired to lower the saw to operative position, the attendant, grasping the handle 46, presses one finger or the thumb against the knob 97 and so swings the bar 85 on its pivot as to release the shoulder 94, the saw being then lowered to the position shown in Fig. 1. It will thus be seen that the bar 85 serves not only as the means for effecting the automatic slight lift of the saw on its return movement, but also as the manually-controlled strut to support the saw well above the work.

When the sawing operation has been completed, the saw drops partially into a groove 99 (see Fig. 4) in the bed frame, but upon the following return movement, a corner 100 of the saw frame contacts with a slide 101 mounted on the bed frame. Projecting through a slot 102 in the bed frame (see Fig. 8) and secured to the slide 101, is a plate 103 having its lower end formed with an extension provided with an upwardly inclined edge or cam surface 104. Said cam 104 engages a pin 105 which projects from the block 83 (see also Figs. 11 and 12). When the slide 101 is pushed rearwardly by the saw frame, the cam 104 lifts the block 83 through the medium of the pin 105 so that the said block 83 and the arm 79 will occupy substantially the relative positions indicated in Fig. 11. This is because the joint between the lever 80 and its arm 79 permits the block 85 to rise, so that the arm 79 occupies the downwardly inclined position shown in said figure. This will release any clamping action of the lifting bar 85 so that the guide 44 and the saw frame may be raised or lowered by hand. When this operation has been performed, the machine is to automatically stop. To effect this, the belt pulley 64 is mounted loosely on the shaft 63, and the hub of said pulley is provided with a pin 106 (see Fig. 6). Said pin 106 is adapted to coöperate with a pin 107 mounted in a collar 108 which is fixed to the shaft 63. A spring 109 is coiled about the shaft between the hub of the pulley 64 and said collar 108, and has a normal tendency to push the pulley 64 away from the collar 108. When the machine is in operation, the parts are in the relative positions indicated in Fig. 6, the pins 106 and 107 acting as a clutch to connect the pulley 64 to the shaft 63. To hold the parts in this interengagement, a lever 110 which is mounted on the shaft 63 is provided with a lug 111 (see Fig. 10) which tapers, being formed with inclined sides. The bearing carried by the bracket 55 is provided with a notch 112 having tapered sides. The parts are so proportioned and relatively mounted that, when the machine is in operation, the lug 111 will occupy substantially the position shown in Fig. 10 and thus hold the pulley 64 pushed over against the pressure of spring 109, so that the pin 106 will engage the pin 107 and drive the shaft 63. When the lever 110 is shifted so that its lug may enter the notch 112, the spring 109 will push the pulley 64 and the lever 110 sufficiently along the shaft to release the pin 106 from the pin 107.

The lever 110 is provided with an extension having a handle 113 so that said lever may be manually operated. But, as has been stated, the separation of the clutch which comprises the pins 106, 107, is to be automatically effected at the end of the sawing operation. To do this, the lever 110 is formed with a downwardly extending arm 114, connected by a link 115 (see Figs. 4, 6, and dotted lines in Fig. 8) with one end of a lever 116 extending under the bed 20 and pivoted thereto at 117, the other end of the lever 116 being connected by a link 118 to the slide plate 103. These connections are such that when the corner 100 of the saw frame contacts with the slide 101 so as to push it rearwardly, the lever and link connections described will actuate the lever 110 to a position where the lug 111 and notch 112 will come into alinement so as to permit the clutch-disconnecting spring 109 to act.

In machines of this character as heretofore constructed, it has been difficult to perform the operation of accurately measuring the length of the stock that is to be cut off. To perform this measuring operation, it is desirable that the saw shall be very close to the work so that a rule can be placed endwise against the saw, by which rule the measurement to the end of the rod or bar can be taken. In order that the stock can be shifted along to obtain the correct measurements, it is of course desirable that the saw shall not be resting upon the stock. The present machine provides means whereby the saw frame will be held up slightly above the work, no matter what may be the diameter of the latter, while the length to be cut off is being measured in the manner mentioned, without having to make any preliminary mark or scratch upon the work. The mechanism for attaining these objects comprises a rod 119 which is rotatably mounted in suitable bearings, said rod having an operating handle 120 at its outer end, its inner or rear end being bent or otherwise formed with an arm 121. Said arm 121 will normally stand in the position indicated in Figs. 5 and 8, but, when swung so that the said arm moves inwardly and upwardly, it will assume the position shown in Fig. 7, engaging the end of arm 79 and lifting the latter, causing the clamp block 83 to slightly lift the saw guide and saw frame through the medium of the lifter rod 85. The saw then occupies the same position relatively to the work that it does on its return movements. As soon as the machine is started (the handle 120 having been, of course, released, so that the arm 121 swings back to normal position), the connections hereinbefore described release the clamp and permit the saw to descend against the work on its first cutting stroke.

Having now described the invention, what I claim is:

1. A power hack saw having means for reciprocating it, a lifter and actuating devices for automatically raising the saw from the work, a handle, and connections between said handle and lifter-actuating devices whereby said handle may be operated to manually raise the saw blade a slight distance above the work to permit a rule to rest in contact with both the saw and the work.

2. A power hack saw comprising a saw, means for reciprocating it, a guide for the saw, a lifter for said guide, a clamp for gripping the lifter, and means for manually actuating the clamp to operate the lifter and raise the saw from the work a slight distance to permit a rule to rest in contact with both the saw and the work.

3. A power hack saw comprising a saw, means for reciprocating it, a guide for the saw, a lifter for said guide, a clamp for gripping the lifter, means for automatically actuating the clamp to lift the saw on each return stroke, and means for manually actuating the clamp to raise the saw when the machine is at rest.

4. A power hack saw comprising a saw, means for reciprocating it, a guide for the saw, a lifter for said guide, a lever and means for actuating it, a clamp for the lifter and having an arm adapted to be actuated by said lever, and a manually operable rock shaft having an arm adapted to actuate said clamp arm, whereby the saw will be automatically lifted at definite times when the machine is in operation, but may be manually lifted through the medium of the same clamp and lifter when the machine is at rest.

5. A power hack saw comprising a saw mounted to reciprocate and move toward and from the work, a lifter bar for the saw, a lever having an opening for said bar and having also a side opening, an arm having a head in said side opening, cam mechanism for shifting said head laterally when the arm is moved relatively to the lever to clamp the lifter bar, and means for actuating said arm.

6. A power hack saw comprising a saw mounted to reciprocate and move toward and from the work, a lifter bar for the saw, a lever having an opening for said bar and having also a side opening, an arm having a head in said side opening, cam mechanism for shifting said head laterally when the arm is moved relatively to the lever to clamp the lifter bar, and means for actuating said arm, said means comprising a lever engaging said arm, and a cam for actuating the last-mentioned lever.

7. A power hack saw comprising a saw mounted to reciprocate and move toward and from the work, a lifter bar for the saw, a lever having an enlarged portion or block provided with a vertical opening for said bar and a transverse circular opening, an arm having a head in said circular opening and provided with a cam on its outer face, a plate covering said circular opening and having a cam to coact with the cam of the head to shift said head toward the lifter bar, and means for actuating said arm to first cause the lifter bar to be clamped and then actuate said lifter bar.

8. A power hack saw having a bed frame, saw-operating mechanism supported by one end of said frame, and a work clamp at the other end, said work clamp having a movable jaw, an operating screw, said frame having a recess, a nut for the screw, said nut having a base formed with a recess, a leg frame below the bed frame, and a bolt having its head in the recess of the nut base, the other end of the bolt being connected to the leg frame.

In testimony whereof I have affixed my signature, in presence of two witnesses.

HERBERT J. LELAND.

Witnesses:
 LIZZIE B. STRACHAN,
 KATHERINE E. NICHOLS.

Copies of this patent may be obtained for five cents each, by addressing the "Commissioner of Patents, Washington, D. C."